United States Patent
Jung (10) Patent No.: US 9,830,434 B2
(45) Date of Patent: Nov. 28, 2017

(54) SYSTEM AND METHOD FOR SECURITY USING ONE-TIME EXECUTION CODE

(75) Inventor: Young Suk Jung, Gyunggi-do (KR)

(73) Assignee: WELLBIA.COM CO., LTD., Seoul (KR)

(*) Notice: Subject to any disclaimer, the term of this patent is extended or adjusted under 35 U.S.C. 154(b) by 2023 days.

(21) Appl. No.: 12/598,945

(22) PCT Filed: May 9, 2008

(86) PCT No.: PCT/KR2008/002617
§ 371 (c)(1),
(2), (4) Date: Nov. 5, 2009

(87) PCT Pub. No.: WO2008/140219
PCT Pub. Date: Nov. 20, 2008

(65) Prior Publication Data
US 2010/0146590 A1    Jun. 10, 2010

(30) Foreign Application Priority Data

May 9, 2007 (KR) .................. 10-2007-0045203

(51) Int. Cl.
*G06F 21/00* (2013.01)
*G06F 21/31* (2013.01)
(Continued)

(52) U.S. Cl.
CPC ............. *G06F 21/31* (2013.01); *G06F 21/10* (2013.01); *G06F 21/105* (2013.01); *G06F 21/52* (2013.01)

(58) Field of Classification Search
CPC ........ H04L 63/12; H04L 67/42; H04W 12/12; G06F 21/54; G06F 21/10; G06F 21/12;
(Continued)

(56) References Cited

U.S. PATENT DOCUMENTS 6,315,195 B1 * 11/2001 Ramachandran ............. 235/380
6,415,386 B1 *  7/2002 Shi et al. ....................... 726/34
(Continued)

FOREIGN PATENT DOCUMENTS

CA        2615469 A1    1/2007
JP      2004508644 A    3/2004
(Continued)

OTHER PUBLICATIONS

International Search Report dated Oct. 27, 2008 for PCT/KR2008/002617.
(Continued)

*Primary Examiner* — Edward Zee
(74) *Attorney, Agent, or Firm* — Hauptman Ham, LLP (57) ABSTRACT

The present invention relates to a security system, and more particularly, to a security system and method using a one-time execution code in an environment in which a client and a server are connected through a network. The server irregularly generates and transmits the one-time execution code to the client, and the client directly executes the one-time execution code on a memory area and transmits the execution result and deletes the one-time execution code on the memory area. Therefore, the server determines whether or not an error exists in the execution result and can prevent forgery and appropriation of the client by blocking the connection with the client.

16 Claims, 7 Drawing Sheets

(51) Int. Cl.
*G06F 21/10* (2013.01)
*G06F 21/52* (2013.01)

(58) Field of Classification Search
CPC ........ G06F 21/105; G06F 21/44; G06F 21/50; G06F 21/52
USPC .......................... 713/184; 709/221; 726/5, 23
See application file for complete search history.

(56) References Cited

U.S. PATENT DOCUMENTS

| | | | | |
|---|---|---|---|---|
| 6,530,025 | B1* | 3/2003 | Nakagawa et al. | 726/4 |
| 6,829,349 | B1* | 12/2004 | Neale et al. | 379/265.09 |
| 7,062,552 | B2* | 6/2006 | Jung | 709/224 |
| 7,169,050 | B1* | 1/2007 | Tyler | 463/42 |
| 7,500,098 | B2* | 3/2009 | Paatero | 713/165 |
| 7,984,304 | B1* | 7/2011 | Waldspurger et al. | 713/187 |
| 8,167,722 | B2* | 5/2012 | Beverly | 463/42 |
| 8,251,704 | B2* | 8/2012 | Woolf et al. | 434/322 |
| 2002/0029342 | A1* | 3/2002 | Keech | 713/184 |
| 2002/0061780 | A1* | 5/2002 | Matsuno et al. | 463/42 |
| 2002/0095589 | A1* | 7/2002 | Keech | 713/189 |
| 2003/0014360 | A1* | 1/2003 | Arditti et al. | 705/39 |
| 2003/0023708 | A1* | 1/2003 | Jung | 709/221 |
| 2005/0010963 | A1* | 1/2005 | Zeng et al. | 725/131 |
| 2005/0027846 | A1* | 2/2005 | Wolfe et al. | 709/223 |
| 2005/0210287 | A1* | 9/2005 | Paatero | 713/201 |
| 2005/0223239 | A1* | 10/2005 | Dotan | 713/188 |
| 2006/0123117 | A1* | 6/2006 | Heutchy et al. | 709/227 |
| 2006/0143453 | A1* | 6/2006 | Imamoto et al. | 713/169 |
| 2006/0259579 | A1* | 11/2006 | Beverly | 709/217 |
| 2007/0019236 | A1* | 1/2007 | Sando | 358/1.15 |
| 2007/0083654 | A1* | 4/2007 | Yotsugi | H04L 67/06 709/226 |
| 2007/0105624 | A1* | 5/2007 | Tyler | 463/29 |
| 2007/0180503 | A1* | 8/2007 | Li et al. | 726/5 |
| 2008/0010339 | A1* | 1/2008 | Shin | H04L 67/02 709/203 |
| 2008/0022290 | A1* | 1/2008 | Ochiai et al. | 719/315 |
| 2008/0076547 | A1* | 3/2008 | Bigelow | G07F 17/3241 463/29 |
| 2008/0220872 | A1* | 9/2008 | Midgley et al. | 463/42 |
| 2010/0231419 | A1* | 9/2010 | Janke | 340/995.12 |
| 2012/0090029 | A1* | 4/2012 | Dotan | 726/22 |

FOREIGN PATENT DOCUMENTS

| | | |
|---|---|---|
| JP | 2006079446 A | 3/2006 |
| KR | 100213188 B1 | 8/1999 |
| KR | 10-2003-0036766 | 5/2003 |
| KR | 10-2004-0027474 | 4/2004 |
| KR | 10-0503772 | 7/2005 |
| KR | 10-2006-0067800 | 6/2006 |
| WO | 02/21463 | 3/2002 |
| WO | 02/44858 | 6/2002 |
| WO | 2007/007112 | 1/2007 |

OTHER PUBLICATIONS

Japanese Notice of Allowance for application No. 2010-507331 dated Mar. 16, 2012, citing the above reference(s).
Korean Notice of Allowance for application No. 10-2007-0045203 dated May 29, 2009, citing the above reference(s).
Korean Office Action for application No. 10-2007-0045203 dated Apr. 24, 2009, citing the above reference(s).

* cited by examiner

SYSTEM AND METHOD FOR SECURITY USING ONE-TIME EXECUTION CODE

CROSS REFERENCE TO RELATED APPLICATION

This application claims the priority of Korean Patent Application No. 10-2007-0045203, filed on May 9, 2007 in the KIPO (Korean Intellectual Property Office), the disclosure of which is incorporated herein in their entirety by reference. Further, this application is the National Phase application of International Application No. PCT/KR2008/002617, filed May 9, 2008, which designates the United States and was published in English. Each of these applications is hereby incorporated by reference in their entirety into the present application.

TECHNICAL FIELD

The present invention relates to a security system, and more particularly, to a security system and method using a one-time execution code in an environment in which a client and a server are connected through a network, capable of detecting forgery or appropriation of a plurality of clients by using the one-time execution code generated by a server and blocking the connection with a client when problems occur in a client program.

BACKGROUND ART

As various types of Internet services are provided and the frequency of use of the Internet increases, Internet crimes leaking personal information on users using the Internet frequently occur. Accordingly, various types of security systems and methods have been developed and sold to prevent the leakage of the personal information stored in a client personal computer (PC).

However, in a case where a client is forged or appropriated in an environment in which clients and servers are connected through a network (referred to as a "CS environment") in an information system using the Internet, a corresponding server may transmit critical personal information stored in the server to the forged or appropriated client without suspicion. In this case, the conventional security system for protecting the personal information is useless.

Particularly, in a case where a malicious code such as a game hacking tool disrupts a client program in an online game, game rules are collapsed, and a fair play cannot be maintained, so that there is a problem in that gainers may lose interest in the game. For example, problems occur due to a Non-Client Bot in an online game. Accordingly, the number of gamers reduces, and this causes economical losses of game providers providing online game services.

DISCLOSURE OF INVENTION

Technical Problem

The present invention provides a security system and method using a one-time execution code, including a server which generates and transmits the one-time execution code used to determine whether or not a client program is genuinere, receives an execution result of the one-time execution code, and blocks the connection with the client when an error exists in the execution result so as to prevent forgery, appropriation, and imitation.

The present invention also provides a security system and method using a one-time execution code, which does not generate a one-time execution code as a file so as not to enable a client to recognize operations for determining forgery or the like of the client using the one-time execution code but directly loads the one-time execution code on a memory area of a client program that is currently executed.

Technical Solution

According to an aspect of the present invention, there is provided a security client using a one-time execution code in an environment in which a server and a client are connected through a network, wherein the security client receives the one-time execution code from the server, loads the one-time execution code on a code container allocated to a memory area of a client program that is currently executed, executes the loaded one-time execution code, transmits the execution result to the server, and deletes the one-time execution code.

In the above aspect of the present invention, the code container may be allocated in advance when the client program is executed and loads the one-time execution code when the one-time execution code is received. In addition, the one-time execution code may be extracted by analyzing packets transmitted from the server. In addition, the received one-time execution code may not be generated as a file but directly loaded on the memory area of the client program.

According to another aspect of the present invention, there is provided a security server using a one-time execution code in an environment in which the server and a client are connected through a network, including: a one-time execution code generator irregularly generating and transmitting the one-time execution code to the client; a result analyzer analyzing an execution result of the one-time execution code transmitted from the client to determine whether or not an error occurs in the result; and a client connection controller blocking the connection with the client when the result analyzer finds the error.

In the above aspect of the present invention, the one-time execution code may call a random function and acquires and generates the one-time execution code according to a result value of the random function. Particularly, the one-time execution code generator may acquire the one-time execution code from a database set in advance or generate a new one-time execution code.

In addition, the result analyzer may determine that an error occurs when the execution result of the one-time execution code is not received or the execution result of the one-time execution code has an error.

According to another aspect of the present invention, there is provided a security method including: a first step of receiving a one-time execution code from a server; a second step of loading the received one-time execution code on a code container in a memory area of a client program that is currently executed; a third step of executing the loaded one-time execution code and transmit the execution result to the server; and a fourth step of deleting the loaded one-time execution code after the execution result is transmitted to the server.

According to another aspect of the present invention, there is provided a security method including: a first step of generating and transmitting a one-time execution code to a client connected through a network; a second step of receiving the execution result of the one-time execution code from the client and analyzing the execution result; and a third step of blocking the connection with the client when an error is found in the result.

In the above aspect of the present invention, the first step of generating the one-time execution code may include: a step of calling a random function; and a step of acquiring and generating the one-time execution code by using a result of the called random function.

Advantageous Effects

As described above, the security system using the one-time execution code according to the present invention can determine genuineness of the client program by using the one-time execution code, find regularity by analyzing all packets between the client and the server, an easily find a forged client program created by using the regularity, and block the connection with the client.

In addition, in the security system using the one-time execution code according to the present invention, the server irregularly generates and transmits the one-time execution code to the client, and the client directly loads the one-time execution code on the memory and deletes the one-time execution code loaded on the memory after executing the one-time execution code. Therefore, an object to forge the client cannot recognize the information on the one-time execution code.

BEST MODE FOR CARRYING OUT THE INVENTION

Exemplary embodiments of the present invention will now be described in detail with reference to the accompanying drawings.

In the description, the detailed descriptions of well-known functions and structures may be omitted so as not to hinder the understanding of the present invention.

Figure 1:
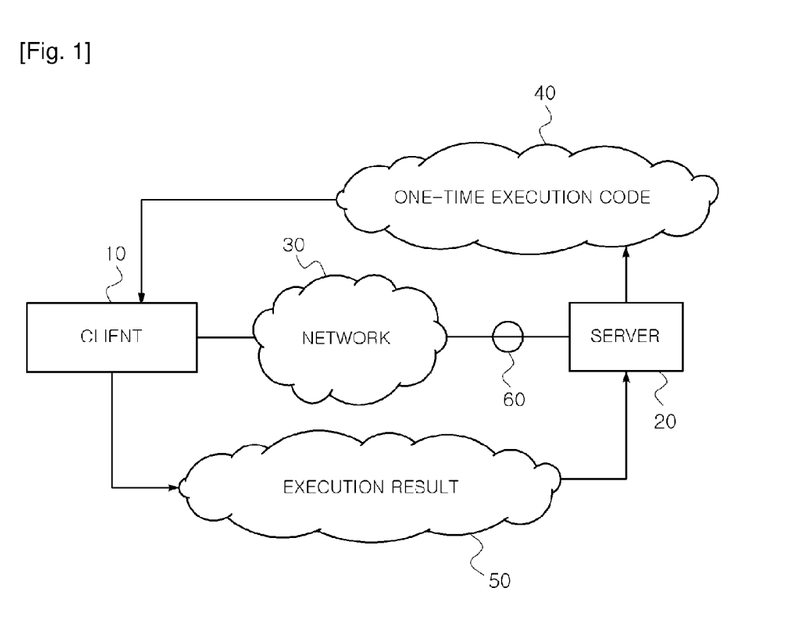
FIG. 1 is a view illustrating a concept of a security system using a one-time execution code according to the present invention.

FIG. 1 is a view illustrating a concept of a security system using a one-time execution code according to the present invention.

The security system using a one-time execution code according to the present invention is used to prevent forgeries or appropriation of a program of a client 10 in an environment in which the client 10 and a server 20 is connected through a network 30 and block a false client that imitates packets between the client 10 and the server 20 from the server.

For this, the server 20 determines genuineness of the client 10 by using a one-time execution code 40. The one-time execution code 40 refers to a code included in a packet to determine whether or not the program of the client 10 is properly operated.

For example, as the one-time execution code 40, a code for calculating a result of an operation of 1+1, a code for calculating a value of checksum, and a code for requiring various values that can be obtained by using an original client program may be used.

When the one-time execution code 40 is generated by the server 20 and transmitted to the client 10, the client 10 executes the one-time execution code 40 and transmits the execution result to the server 20.

When the execution result is transmitted to the server 20, the server 20 determines whether or not the received execution result is right. When an error occurs in the determination, the connection to the client 10 is disrupted. For example, in a case where the execution result of the one-time execution code 40 is not received, or in a case where errors exist in the result of the operation of 1+1, the value of the checksum, or the values obtained by using the original client program, the server 20 blocks the connection from the client 10.

Specifically, the client 10 performs an operation of the one-time execution code 40 and transmits an execution result 50, and the server 20 determines whether or not an error exists in the execution result 50 and controls the connection with the client 10 (operation 60).

In this case, the client 10 does not generate information on the one-time execution code 40 as a file but stores the one-time execution code 40 in a memory so that the one-time execution code 40 is executed and deleted from the memory. This will be described with reference to FIG. 2 in detail.

Figure 2:
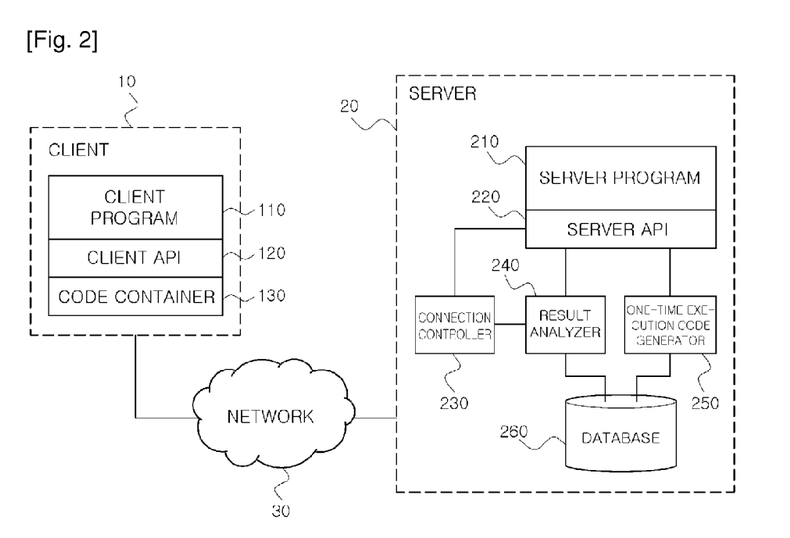
FIG. 2 is a view illustrating a configuration of the security system using the one-time execution code according to the present invention.

FIG. 2 is a view illustrating a configuration of the security system using the one-time execution code according to the present invention.

The security system using the one-time execution code includes the client 10 and the server 20. A plurality of the clients may be connected to the single server 20. However, here, a case where the single client 10 and the single server 20 are connected in the network 30 is exemplified.

The client 10 includes a client program 110, a client application programming interface (API) 120, and a one-time execution code container (hereinafter, referred to as a "code container") 130. The client program 110 is a program executed by the client 10 in relation to the server 20. For example, when the client 10 executes an online game through the server 20, the program for executing the online game has to be set in the client 10.

When the client program 110 is executed, an operating system of the client 10 loads the original client program 110 stored in the client 10 and the client API 120 on the memory. Here, the client API 120 may be included in the client program 110.

The code container 130 is a memory space for loading the one-time execution code transmitted from the server 20. The code container 130 is allocated to the memory area of the client program 110 that is currently executed. Specifically, the code container 130 that is a memory space for loading the one-time execution code is allocated by using the client API 120 provided when the client program 110 is executed. Components of the client 10 will be described with reference to FIG. 3 in detail.

The server 20 generates and transmits the one-time execution code to the client 10, receives and analyzes the execution result from the client 10, and when an error exists, blocks the connection with the client 10.

For this, the server 20 includes a server program 210, a server API 220, a connection controller 230, a result analyzer 240, a one-time execution code generator 250, and a database 260.

The server 20 connects to a plurality of the clients and responses to requests of the clients. Therefore, the server program 210 of the server 20 keeps operating as long as at least one client is connected. An operating system of the server 20 loads the server program 210 and the server API 220.

The one-time execution code generator 250 generates and transmits the one-time execution code for determining genuineness of the client program 110. The one-time execution code is generated as an irregular one-time execution code that cannot be easily predicted so that information on the one-time execution code cannot be recognized by the client. For this, the one-time execution code generator 250 calls a random function, determines whether or not to generate the one-time execution code according to a result of the random function, and generates a random one-time execution code.

The one-time execution code may be generated by using data set by the database 260 in advance, or a new arbitrary one-time execution code may be generated by using a random number generator.

The generated one-time execution code is transmitted to the client 10 through the server program 210.

The result analyzer 240 receives the execution result of the one-time execution code from the client 10 and analyzes the execution result to determine whether or not an error exists. The result analyzer 240 stores execution results of one-time execution codes in the database 260 in advance and determines whether or not an error occurs by comparing the execution result received from the client 10 with the execution results stored in the database 260. In addition, in a case where the execution result is not received, it is determined that an error occurs.

The result analyzer 240 may perform the determination by its own operation when the one-time execution code is generated as the simple operation or obtained through execution of the client program 110.

The connection controller 230 blocks the connection with the client 10 in the case where the result analyzer 240 determines that the error exists in the execution result.

Figure 3:
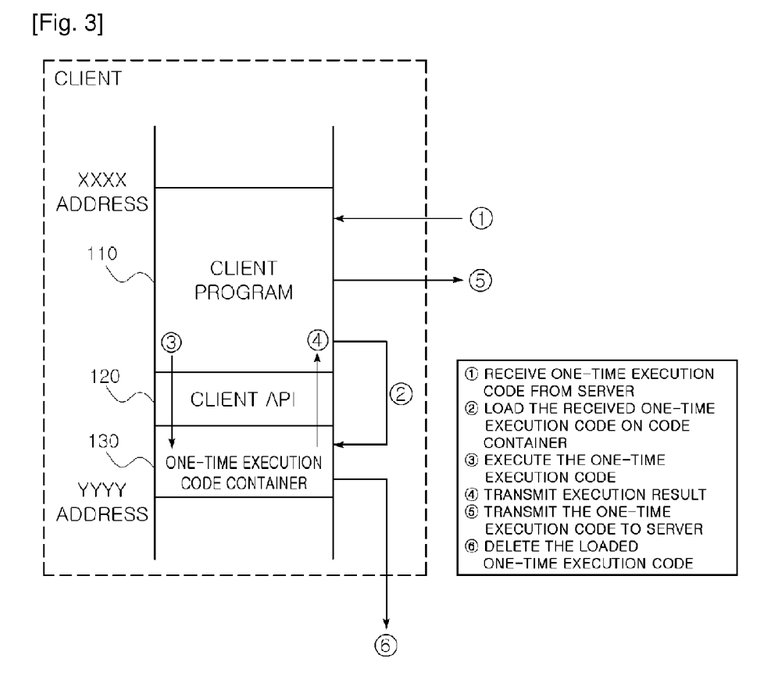
FIG. 3 is a view illustrating a one-time execution code processing sequence according to the present invention.

FIG. 3 is a view illustrating a one-time execution code processing sequence according to the present invention.

When the client program 110 including the client API 120 is executed, the operating system loads the corresponding client program 110 and the client API 120 at an address of XXXX on a memory map. Here, the client API 120 allocates the code container 130 to load the one-time execution code that is to be transmitted from the server 20.

The one-time execution code processing sequence includes that ① a one-time execution code is received from the client 10 to the server 20. Here, the one-time execution code can be obtained by extracting the one-time execution code from a packet received from the server 20. Thereafter, when the one-time execution code is received, ② the received one-time execution code is loaded on the code container 130. When the one-time execution code is loaded, ③ the client API 120 executes the one-time execution code by using the client program 110 and acquires an execution result. Here, the one-time execution code is not generated as a file in the client but directly loaded on the code container 130 of the memory to be executed. When the one-time execution code is executed and the execution result is acquired, ④ the execution result is transmitted to the client program, and ⑤ the execution result is directly transmitted to the server through the network. When the execution result is transmitted, ⑥ since the one-time execution code finishes its role, the one-time execution code is deleted from the code container 130.

Figure 4:
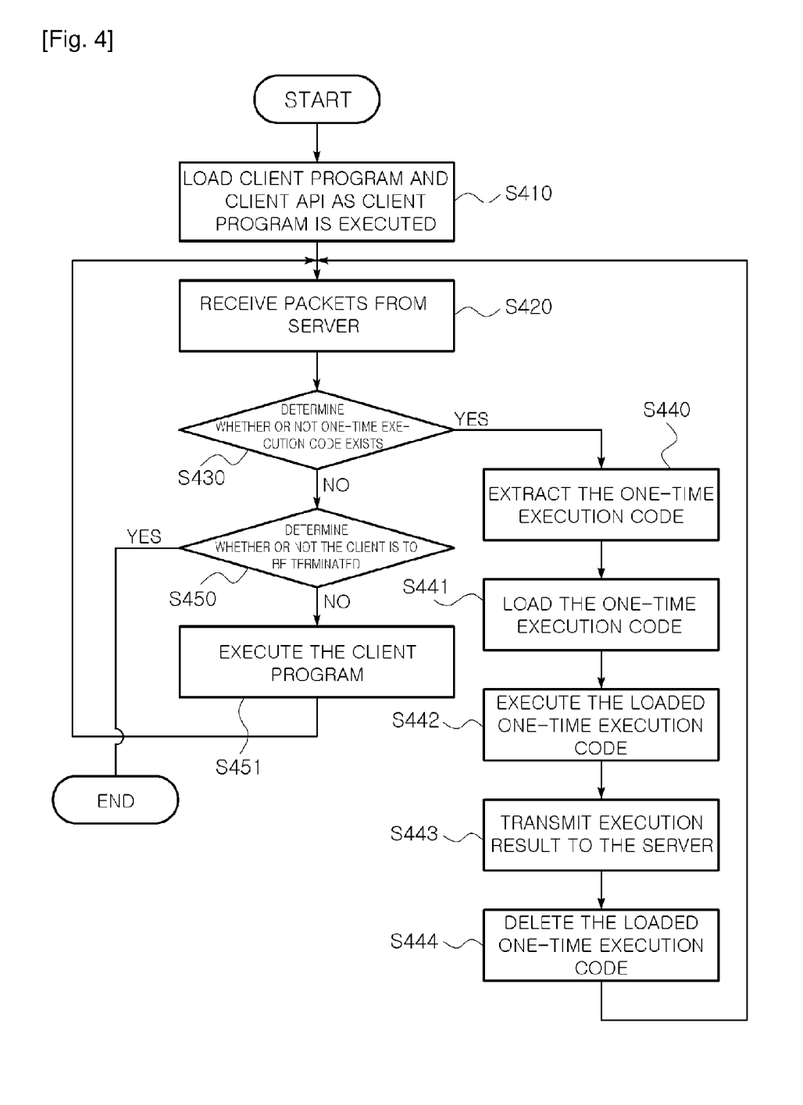
FIG. 4 is a flowchart of operations of a client in the security system using the one-time execution code according to the present invention.

FIG. 4 is a flowchart of operations of the client in the security system using the one-time execution code according to the present invention.

The client loads the client program and the client API on the memory as the client program is executed (operation S410).

The client program receives a packet from the server (operation S420), and the client and the server are connected in the network and transceive packets.

When the packets are received, the client program determines whether or not a one-time execution code exists in the packet (operation S430).

According to a result of the determination, when the one-time execution code exists, the one-time execution code is extracted from the packet (operation S440).

When the one-time execution code is extracted, the one-time execution code is not generated as a file but loaded on the container allocated directly to the memory area of the client program (operation S441).

When the one-time execution code is loaded on the code container, the client program executes the one-time execution code and obtains the execution result (operation S442).

After acquiring the execution result, the one-time execution code is transmitted to the server through the network (operation S443).

After the execution result of the one-time execution code is transmitted, the one-time execution code loaded on the code container is deleted (operation S444), and the client continues receiving packets and performs the aforementioned operations.

When the one-time execution code is not included in the received packet, it is determined whether or not the client program is to be terminated (operation S450). When the client program is to be terminated, the client is terminated. Otherwise, the client program continues to be executed (operation S451).

Figure 5:
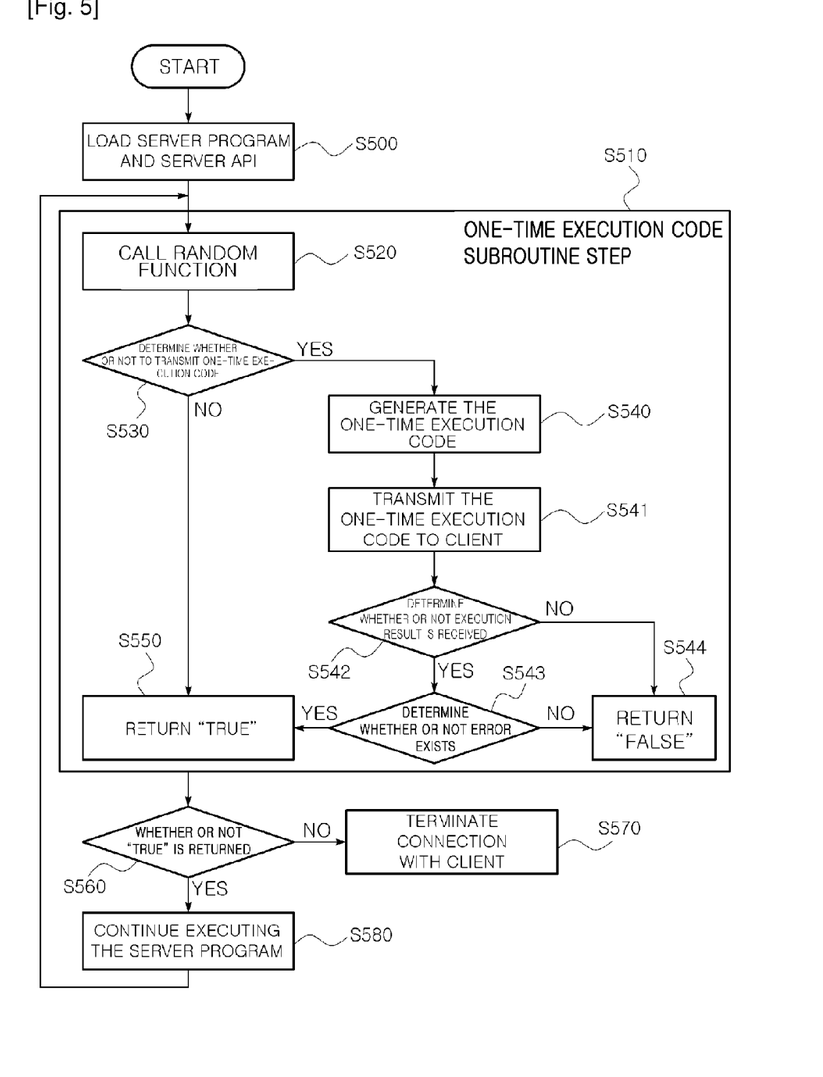
FIG. 5 is a flowchart of operations of a server in the security system using the one-time execution code according to the present invention.

FIG. 5 is a flowchart of operations of the server in the security system using the one-time execution code according to the present invention.

When the server program is executed, the operating system of the server loads the server program and the server API and calls a one-time execution code subroutine (operation S500).

Through the operation of executing the called one-time execution code subroutine, whether or not an error exists in the execution result from the client is determined. According to a result of the determination, it is determined whether or not a returned value is TRUE (operation S560). When the returned value is TRUE, the server program continues to be executed (operation S580), and when the returned value is not TRUE, the connection with the client is terminated (operation S570). Hereinafter, operations S510 of the one-time execution code subroutine are described.

When the server program and the server API are loaded, the one-time execution code generator 250 calls a random function (operation S520).

When the random function is called, it is determined whether or not the one-time execution code is to be transmitted by using a value obtained by using the called random function (operation S530). The one-time execution code is transmitted at irregular time intervals so that the one-time execution code does not need to be continuously transmitted, and the results of the irregularly transmitted one-time execution codes are used.

When it is determined that the one-time execution code is to be transmitted according to the value of the random function, the one-time execution code generator 250 generates a one-time execution code (operation S540). A code stored in the database in advance may be used as the one-time execution code, or a new code may be generated as the one-time execution code. Here, the one-time execution code may be irregularly generated so that one-time execution code cannot be easily recognized by the client.

When the one-time execution code is taken, the one-time execution code is transmitted to the client (operation S541). In this case, the one-time execution code is included in a packet to be transmitted to the client through the network.

When the one-time execution code is transmitted to the client, the client executes the one-time execution code and returns the execution result to the server. However, in a case where the client program is forged, appropriated, or imitated, the client program cannot recognize whether or not the one-time execution code is transmitted, so that the one-time execution code cannot return the execution result to the server.

Therefore, the result analyzer of the server determines whether or not the execution result is received from the client (operation S542).

According to a result of the determination, when the execution result is not received, the server determines that an error occurs and outputs a return "FALSE".

According to the result of the determination, when the execution result is received, it is determined whether or not an error exists in the execution result (operation S543). When the error is found in the execution result, the result analyzer 240 outputs the return "FALSE" (operation S544). When an error is not found, the result analyzer 240 outputs the return "TRUE" (operation S550).

As described above, whether or not the return "TRUE" is output by the one-time execution code subroutine is output, it is determined whether or not the connection with the client is to be terminated is determined.

Figure 6:
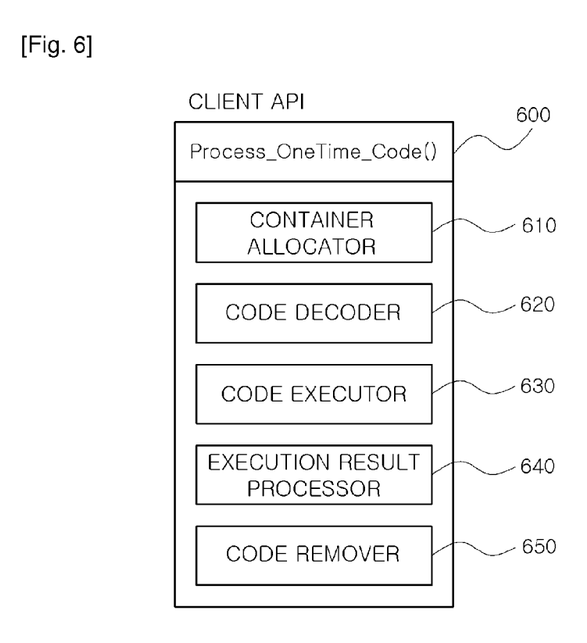
FIG. 6 is a view illustrating a configuration of a client API of the client according to the present invention.

FIG. 6 is a view illustrating a configuration of the client API of the client according to the present invention.

When data transmitted from the server is determined as the one-time execution code, the client API calls a function called a Process_OneTime_Code 600 from the client program. The name of the function may be changed. The Process_OneTime_Code 600 has functions of executing the received one-time execution code, transmitting the execution result to the server, and removing the one-time execution code after transmitting the one-time execution code.

Specifically, the Process_OneTime_Code 600 includes a code container allocator 610 for allocating the code container on the memory area, a code decoder 620 for decoding the one-time execution code in a case where the one-time execution code transmitted from the server is encoded, a code executor 630 for loading the received one-time execution code on the code container and executing the one-time execution code, an execution result processor 640 for transmitting the execution result of the one-time execution code executed by the code executor 630, and a code remover 650 for removing the one-time execution code loaded on the code container after the execution result is transmitted.

Figure 7:
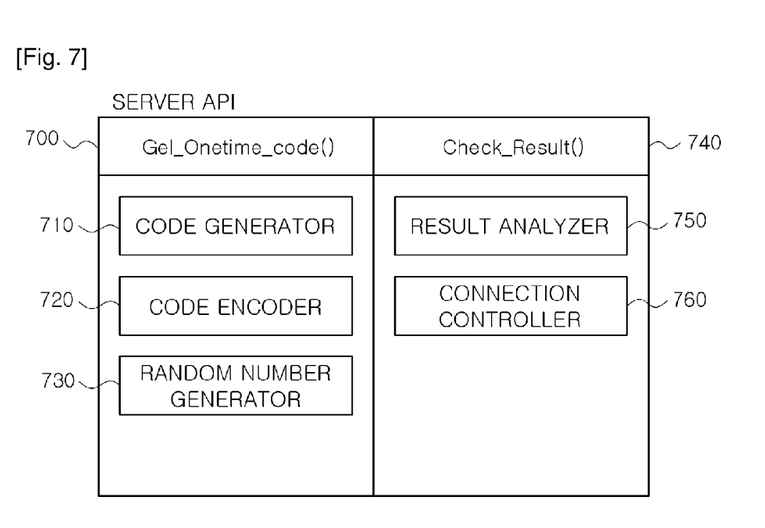
FIG. 7 is a view illustrating a configuration of a server API of the server according to the present invention.

FIG. 7 is a view illustrating a configuration of the server API of the server according to the present invention.

The server API of the server generates and transmits the one-time execution code having irregular characteristics to the client in order to determine genuineness of the client program. In addition, in order to analyze the execution result transmitted from the client and determine whether or not to terminate the connection with the client, the server API calls functions called Get_OneTime_Code 700 and Check_Result 740 from the server program. The names of the functions may be changed.

When the server API calls the function of Get_OneTime_Code 700, the Get_OneTime_Code 700 determines whether or not to generate the one-time execution code according to a result of a random number generator 730. The one-time execution code is only needed to determine whether or not the client program is original, so that the one-time execution code may be generated in various types at proper time intervals.

According to the result of the random number generator 730, when it is determined that the one-time execution code is to be generated, a code generator 710 generates the one-time execution code. When the one-time execution code is generated by the code generator 710, a code encoder 720 encodes the generated one-time execution code and transmits the encoded one-time execution code to the client. Thereafter, the execution result of the one-time execution code is received from the client.

When the server API receives the execution result from the client, the server API calls the Check_Result 740 by using the execution result as a parameter. The Check_Result 740 analyzes the received execution result by using a result analyzer 750 and determines whether or not an error exists in the execution result. When the result analyzer 750 determines that the error exists, a connection controller 760 blocks the connection with the client.

While the present invention has been shown and described in connection with the exemplary embodiments, it will be apparent to those skilled in the art that modifications and variations can be made without departing from the spirit and scope of the invention as defined by the appended claims.

The invention claimed is:

1. A security client comprising a processor and a memory, the security client configured to use a one-time execution code in an environment in which a server and the security client establish a connection through a network, wherein the security client automatically receives, from the server, the one-time execution code without a user interaction,
    wherein the received one-time execution code is included in a packet between the server and the security client, the packet being transmitted from the server to the security client,
    wherein the one-time execution code is repeatedly generated as irregular by the server while the connection with the security client is maintained, for determining whether a client program is appropriate,
    wherein the security client is configured to load the one-time execution code on a code container, the code container being pre-allocated in a part of the memory which is already occupied by the client program, and obtain an execution result of the loaded one-time execution code while executing the client program,
    wherein the received one-time execution code is not generated as a file but directly loaded on the pre-allocated part of the memory which is already occupied by the client program,
    wherein the security client transmits the execution result to the server, and deletes the one-time execution code from the code container after the transmitting of the execution result, wherein the transmitted execution result is included in a packet between the server and the security client, the packet being transmitted from the security client to the server.

2. The security client of claim 1, wherein the code container is pre-allocated when the client program is started and loads the one-time execution code when the one-time execution code is received.

3. The security client of claim 1, wherein the one-time execution code is extracted by analyzing the packet transmitted from the server to the security client.

4. The security client of claim 1, wherein the execution result of the one-time execution code is associated with verifying the client program, not associated with verifying a user of the client program.

5. The security client of claim 1, wherein the execution result of the one-time execution code is obtained without a user interaction.

6. A security server configured to use a one-time execution code in an environment in which the server and a security client establish a connection through a network, the server comprising:
   a processor and a memory;
   a one-time execution code generator, implemented using the processor, configured to generate and transmit the one-time execution code for determining whether a client program is appropriate, the transmitted one-time execution code being included in a packet between the server and the client program, wherein the one-time execution code is not generated as a file but configured to be directly loaded on a pre-allocated part of a memory area which is already occupied by the client program running on the security client;
   a result analyzer, implemented using the processor, configured to analyze an execution result of the loaded one-time execution code transmitted from the security client to determine whether or not an error occurs in the execution result, the execution result of the loaded one-time execution code being obtained by the security client while executing the client program, wherein the transmitted execution result being included in a packet between the server and the client program; and
   a client connection controller, implemented using the processor, configured to block the connection with the security client when the result analyzer finds the error,
   wherein the one-time execution code is repeatedly generated as irregular, and the one-time execution code is repeatedly transmitted to the security client without a user interaction, while the connection with the security client is maintained, and
   wherein it is determined based on random value whether or not the one-time execution code is generated.

7. The security server of claim 6, wherein the one-time execution code generator calls a random function for determining whether or not the one-time execution code is generated, the random value being obtained by the random function, whereby the generating of the one-time execution code is randomly occurred.

8. The security server of claim 7, wherein the one-time execution code generator acquires the one-time execution code from a database set in advance or generates a new one-time execution code.

9. The security server of claim 6, wherein the result analyzer determines that an error occurs when the execution result of the one-time execution code is not received or the execution result of the one-time execution code has an error.

10. The security server of claim 6, wherein the execution result of the one-time execution code is associated with the client program, not associated with a user of the client program.

11. The security server of claim 6, wherein the execution result of the one-time execution code is obtained at the security client without a user interaction.

12. A security method, comprising:
   receiving, from a server, a one-time execution code for determining whether a client program is appropriate without a user interaction,
      wherein the received one-time execution code is included in a packet between a server program running on the server and a client program running on a security client, the packet being transmitted from the server to the security client through a connection established between the server and the security client on a network;
   loading the received one-time execution code on a code container, the code container being pre-allocated in a part of a memory area which is already occupied by the client program, and wherein the received one-time execution code is not generated as a file but directly loaded on the pre-allocated part of the memory area which is already occupied by the client program;
      wherein the one-time execution code is repeatedly generated as irregular by the server while the connection with the security client is maintained;
   obtaining an execution result of the loaded one-time execution code while executing the client program and transmitting the execution result to the server, wherein the execution result of the one-time execution code is obtained without a user interaction,
      wherein the transmitted execution result is included in a packet between the server program and the client program, the packet being transmitted from the server to the security client; and
   deleting the loaded one time execution code from the code container after the execution result is transmitted to the server.

13. A security method, comprising:
   generating a one-time execution code for determining whether a client program is appropriate and transmitting the one-time execution code to a security client connected through a connection established between a server and the security client on a network, the transmitted one-time execution code being included in a packet between the server and the client program, wherein the one-time execution code received by the security client is not generated as a file but directly loaded on a pre-allocated part of a memory area which is already occupied by the client program running on the security client,
   receiving the execution result of the one-time execution code from the security client and analyzing the execution result, the transmitted execution result being included in a packet between the server and the client program; and
   blocking the connection with the security client when the execution result indicates that the client program is inappropriate,
   wherein the one-time execution code is repeatedly generated as irregular, and the one-time execution code is repeatedly transmitted to the security client without a user interaction, while the connection with the security client is maintained, wherein it is determined based on random value whether or not the one-time execution code is generated, and wherein the execution result of the one-time execution code is obtained at the security client while executing the client program and without a user interaction.

14. The security method of claim 13, wherein the generating the one-time execution code comprises:

calling a random function; and acquiring and generating the one-time execution code by using a result of the called random function.

15. The security method of claim 14, wherein the one-time execution code is acquired form a database set in advance or a new one-time execution code is generated.

16. A non-transitory computer-readable recording medium having recorded thereon a program for performing the method of claim 12.

* * * * *